United States Patent [19]

Moore

[11] 4,359,188
[45] Nov. 16, 1982

[54] ASSEMBLY MEANS FOR FULL COVERAGE RECIRCULATING SPRAYER

[75] Inventor: John O. Moore, Helena, Ark.

[73] Assignee: Sprayrite Manufacturing Co., West Helena, Ark.

[21] Appl. No.: 197,224

[22] Filed: Oct. 15, 1980

[51] Int. Cl.³ .............................................. B05B 1/28
[52] U.S. Cl. ...................................... 239/121; 47/1.7; 239/148; 239/175
[58] Field of Search .................... 239/104, 120–122, 239/124, 145, 146, 148, 159, 163, 170, 172, 175; 261/98, 100, 103, 106; 47/1.5, 1.7

[56] References Cited

U.S. PATENT DOCUMENTS

| | | | |
|---|---|---|---|
| 1,143,941 | 6/1915 | Brown | 261/106 |
| 2,225,740 | 12/1940 | Feinberg | 261/106 |
| 2,360,669 | 10/1944 | Goethel | 261/98 |
| 4,168,798 | 9/1979 | Moore et al. | 239/121 |
| 4,273,285 | 6/1981 | Scholbrock | 239/121 |

OTHER PUBLICATIONS

Southwest Farm Press, Aug. 14, 1975, p. 18.
Toll Agri-Spray Brochure entitled "Recircu-Sprayer For Efficient Low Cost Post-Emergence Weed Control", 1976.
Riverside brochure entitled "A New Concept In Post–Emergent Weed Control. The Recovery Sprayer", 1975.

*Primary Examiner*—Andres Kashnikow
*Assistant Examiner*—Michael J. Forman
*Attorney, Agent, or Firm*—Hill, Van Santen, Steadman, Chiara & Simpson

[57] ABSTRACT

A recirculating sprayer assembly directs treatment spray streams against a collector means having its lower end extending through an enlarged opening in a reservoir means. A screen means extends between the collector means and the adjoining edge or edges of the reservoir means. Alternatively, a fibrous mat collector is folded over with its free ends positioned within a tray member. A plurality of ports pass the recovered liquid retrieved by the mat into the reservoir as well as limit the admission of foreign particles into the reservoir. At the upper end of the tray, lip surfaces flare outwardly away from the collection plane of the mat to collect loose drops falling from the mat and return them to the tray for passage into the reservoir. In a still further embodiment, a folded-over fibrous mat collector fits into an upper slot opening of a trough-shaped reservoir having upper wall side openings extending generally outwardly from the collection plane of the mat. These side openings are covered by screen filter means through which drops falling from the mat pass into the reservoir and by which foreign particles are prevented from entering the reservoir.

16 Claims, 8 Drawing Figures

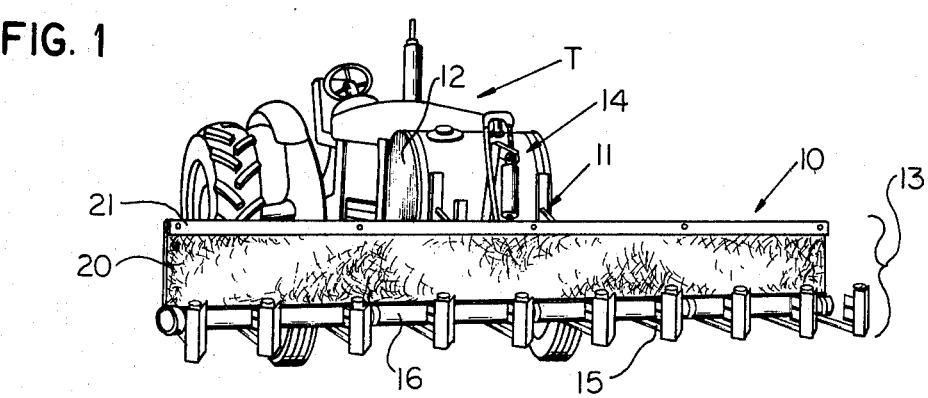
FIG. 1
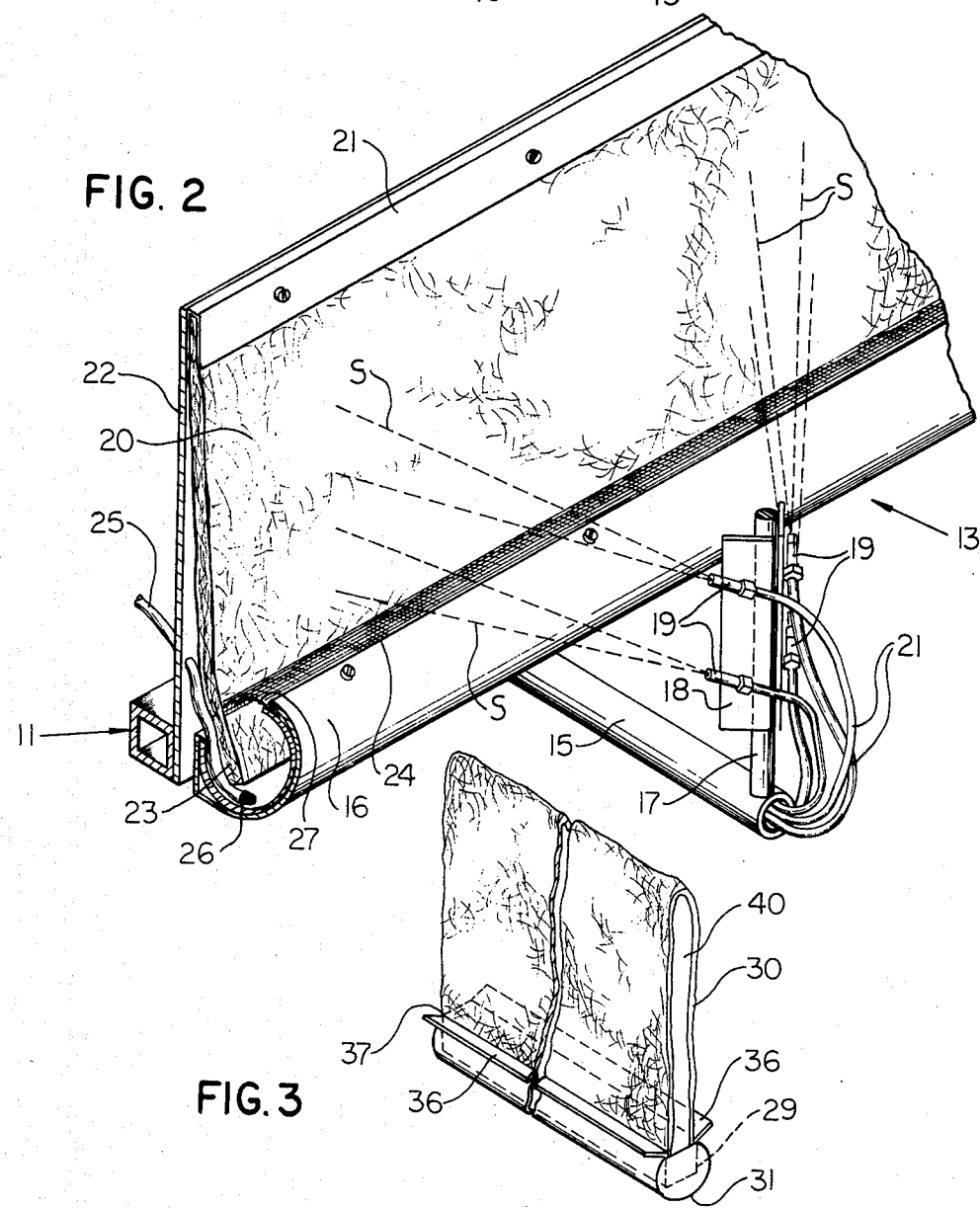
FIG. 2
FIG. 3

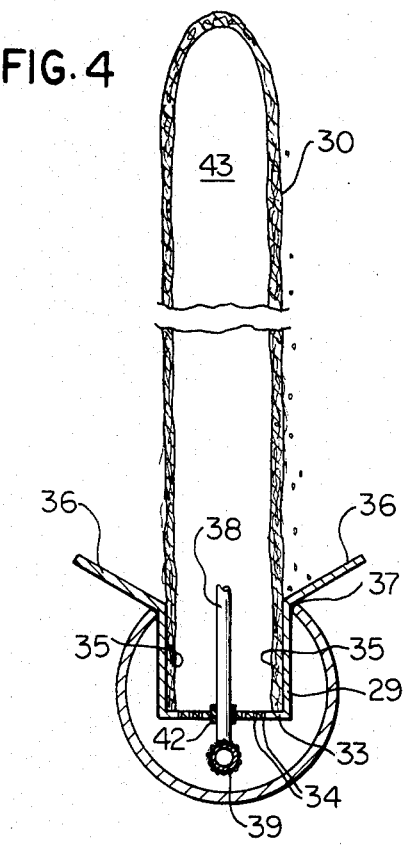
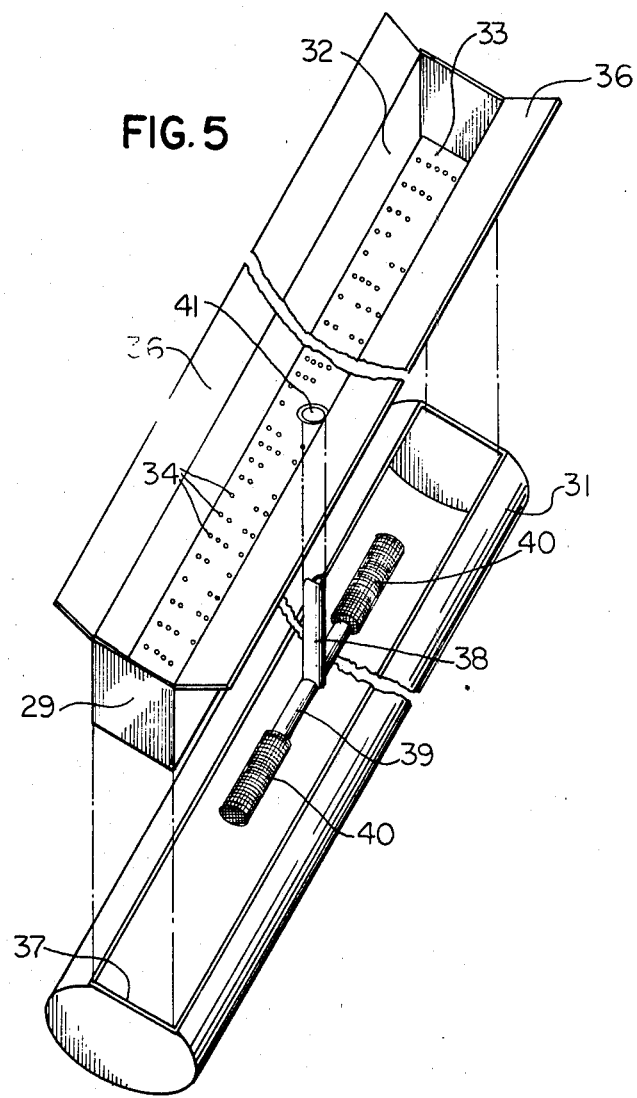
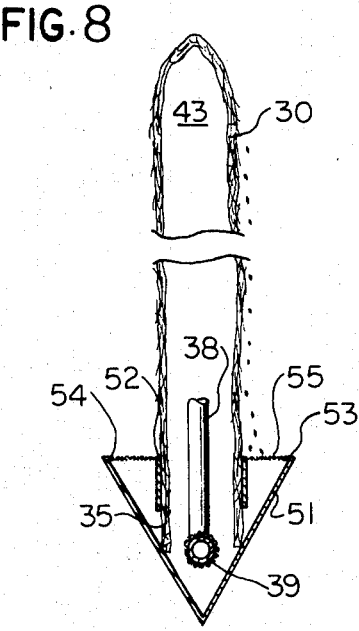
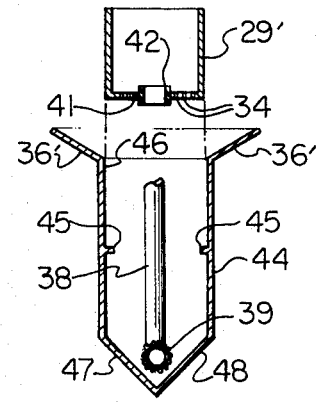
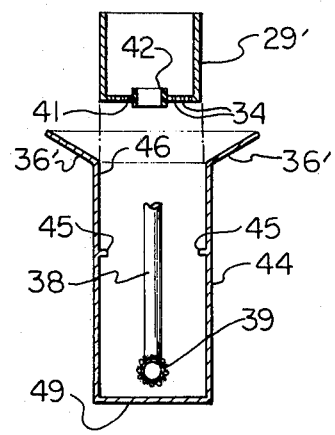

ASSEMBLY MEANS FOR FULL COVERAGE RECIRCULATING SPRAYER

BACKGROUND OF THE INVENTION

1. Field of the Invention

The invention relates to herbicide and/or insecticide application devices for farm crop and pastures which reclaim and reuse spray material that does not contact target weeds or other plant material.

2. The Prior Art

U.S. Pat. No. 4,168,798 to John O. Moore et al discloses a recirculating sprayer assembly for the application of herbicidal and other liquids to standing vegetation having spray nozzles for directing spray streams across a treatment zone onto a collector means for intercepting the spray streams after passage among the vegetation. There is a reservoir means for collecting liquid recovered by the collector and suction means to draw recovered liquid from the reservoir means back to a supply tank from which liquid is drawn and pressurized for passage through the sprayer system. The recirculating sprayer assembly may be mounted on a tractor for traversing an agricultural area.

One form of collector means disclosed in U.S. Pat. No. 4,168,798 is a generally planar fibrous mat extending transverse to the travel direction of the tractor and mounted over a correspondingly extended reservoir. The fibrous material of the mat reduces splatter from spray stream impact and also tends to operate as a filter, thereby separating contaminants and impurities so that the liquid to be recirculated is relatively clean. The admission of foreign particles into the reservoir is limited by the lower end of the mat extending through an opening in the reservoir.

SUMMARY OF THE INVENTION

The recirculating sprayer assembly of the present invention utilizes a generally planar fibrous mat to form a collector surface for retrieving solid spray streams directed thereagainst across a treatment zone. Such surface may be disposed either transversely or parallel to the direction of travel. The mat is of a narrow thickness such that it fits loosely at its lower end within a slot shaped reservoir opening. Positioned snugly between the mat and opposed edges of the opening is a screen element which prevents the entry of foreign particles into the reservoir.

In another form of the invention, a tray portion fits snugly within the reservoir opening. A collector surface in the form of a folded-over fibrous mat is mounted within the tray upon a bottom wall thereof and extends upwardly out of the tray to form a generally planar collecting surface for receiving spray streams directed across a treatment zone. The bottom wall of the tray is provided with a plurality of small holes through which recovered liquid passes into the reservoir and which serve to filter out foreign particles from the reservoir. The tray is formed with generally inclined lip surfaces extending outwardly from the reservoir opening and positioned forwardly of the mat collector surface in order to recover spray stream drops falling from the mat and deliver them toward the tray and into the reservoir.

In yet another embodiment, a V or trough-shaped reservoir is used which has a slot opening in its upper surface for receiving the free ends of a folded-over fibrous mat collector surface. On either side of the slot opening are formed side surface openings into the reservoir. These side surface openings extend outward in a normal direction from the collector plane of the mat and serve to catch liquid drops falling from the mat and deliver them to the reservoir. The side surface openings are covered by screens to limit the admission of foreign particles into the reservoir.

BRIEF DESCRIPTION OF THE DRAWINGS

FIG. 1 is a front side elevational view in perspective of a farm tractor with a recirculating sprayer assembly of the present invention mounted on the front thereof.

FIG. 2 is a partly broken-away side elevational view in perspective of a portion of the recirculating sprayer assembly of FIG. 1.

FIG. 3 is a side elevational view in perspective of a collector surface and tray arrangement fitted within a recirculating assembly reservoir in accordance with the present invention.

FIG. 4 is a cross-sectional side elevational view of the collector and tray arrangement of FIG. 3 fitted within the reservoir.

FIG. 5 is an assembly view of the arrangement of FIG. 3.

FIG. 6 is a cross-sectional side elevational assembly view of an alternative embodiment of the tray and reservoir arrangement of FIG. 3.

FIG. 7 is a cross-sectional side elevational assembly view of another alternative embodiment to the tray and reservoir arrangement of FIG. 3.

FIG. 8 is a cross-sectional side elevational view of a reservoir and mat surface, wherein the reservoir is V-shaped and has side surface openings for receiving drops falling from the mat.

DESCRIPTION OF THE PREFERRED EMBODIMENTS

While the principles of the present invention are illustrated as applicable to a recirculating sprayer assembly 10 carried for traversal over an agricultural area by a tractor T or other vehicle as shown in FIG. 1, it should be understood that the principles of the present invention are equally applicable to an arrangement wherein the spray assembly disposes plural collection surfaces parallel to the direction of travel. Accordingly, the specific disclosure herein described is exemplary only and it is intended that the principles of the invention be applicable to all structural forms of sprayers as set forth in earlier patent U.S. Pat. No. 4,168,798. The sprayer assembly 10 comprises a support framework 11 for carrying a treatment liquid supply tank 12 and a spray applicator and collector section 13. A height adjustment mechanism 14 serves to raise and lower the applicator and collector section 13 as desired by means of hydraulic power. The assembly may be mounted onto the tractor in the same general manner as set forth in U.S. Pat. No. 4,168,798.

With reference to FIG. 2, the spray applicator and collection section 13 comprises a plurality of spray booms 15 extending outwardly relative to a transversely arranged reservoir container 16. Carried on a front end of each boom 15 is an upstanding pin 17. Brackets 18 positioned on each pin 17 carry a plurality of spray nozzles 19 for directing generally solid liquid streams S at oblique angles across a treatment zone defined between the spray nozzles and a generally planar collection surface 20 positioned longitudinally with the reservoir container 16. Noxious weeds extending above a crop height may be destroyed by spraying herbicidal chemical across this treatment zone. Spray streams not contacting a weed will pass unobstructed to the collector surface 20. The array of nozzles set up a series of criss-cross stream patterns along the length of the sprayer assembly. Each nozzle 19 creates a solid stream of liquid rather than a diffused cone or mist of spray, to avoid loss of liquid which would drift onto the top of farm crops and into the soil. The spray nozzles 19 are supplied with pressurized herbicide or other srpay liquid by means of plastic tubes 21 passing through the booms 15 and connected with a supply distributor (not shown) on the assembly. The spray nozzle brackets may be adjustable by means of collar and screw attachments in a manner as disclosed in U.S. Pat. No. 4,168,798.

The collector surface 20 is in the form of an absorptive fibrous mat which reduces splatter from impact of the spray streams. The mat is supported at its upper end above the reservoir 16 by support bracket means 21 positioned on a backing wall member 22 carried by the sprayer assembly support framework. A lower end 23 of the mat 20 extends freely into the reservoir through an upper slot or opening 24 formed therein. Liquid absorbed by the mat trickles downward therein for collection in the reservoir. The recovered liquid is then drawn into a suction tube 25, which may have a screen 26 or other filter means attached across the inlet of the tube. The suction tube delivers the liquid back into a flow circuit in the sprayer assembly for passage to the supply tank 12 from which treatment liquid is pumped to the spray nozzles in the manner as disclosed in U.S. Pat. No. 4,168,798.

In accordance with one form of the present invention, the lower edge of the mat passes through the reservoir opening 24. There extends between the collection face or plane of the mat and spaced-apart opposed edges of the opening 24, a screen element 27 constituting a foraminous or porous filter means to limit the admission of foreign particles into the reservoir. If desired, the mat may abut the back edges of the reservoir opening such that the only open spaces to be covered by the screen 27 occur at the forward facing side of the mat. Alternatively, the screen 27 could be located at both edges of the opening 24.

With the use of this arrangement, liquid drops falling from the collector surface pass through the screen 27 and are returned to the reservoir. The relatively enlarged reservoir opening permits the lower end of the mat 20 to be quickly and easily inserted into the reservoir, either before or after attachment of the screen across the reservoir opening.

Additionally, as recognized in U.S. Pat. No. 4,168,798, the fibrous material of the mat itself tends to operate as a filter so that liquid being deposited therefrom into the reservoir is relatively clean. Accordingly, the mat 20 and screen 27 in combinative cooperation serve to prevent the entry of particles into the reservoir and so avoid contamination or clogging of the recirculating sprayer flow system.

FIG. 3 illustrates another embodiment of the present invention wherein a tray member 29 supports a collector surface 30 in a recirculating sprayer reservoir 31. With reference to FIGS. 3–5, the tray 29 has a generally rectangular box-like main body 32 having an open upper end opposed from a closed bottom wall 33. The bottom wall 33 is formed with a plurality of port holes 34 providing fluid communication between the box and the interior of the reservoir 31. The collector surface 30 is in the form of a folded-over fibrous mat and mounted within the box volume of the tray whereby opposed free ends 35 of the mat 30 fit into the tray. The mat extends freely out of the tray, due to its inherent resiliency, with first and second faces forming separate first and second absorptive collection surfaces for receiving sprayer assembly treatment spray streams. If disposed in the direction of travel, the first and second surfaces may receive streams from different nozzles.

Flared edge surfaces or lips 36 extend outwardly and upwardly from the top first and second edges of the tray. The tray lips 36 are directed outwardly and away from the collection plane faces of the mat to catch liquid drops which may fall from the mat surface and direct them to the tray. As shown by FIG. 5, the box body 32 of the tray fits snugly within a slot opening 37 of the reservoir such that the lip surfaces rest upon edges of the opening. Within the reservoir, a suction line 38 is formed with a T-shaped intake conduit 39 having screens or other filter means 40 across the opposed inlet openings thereof. The suction tube 38 extends upwardly through the tray by means of an opening 41 formed in the bottom wall 33. A grommet means 42 serves to sealably support the tube through the bottom wall opening. The tube 38 then extends longitudinally along the tray in an open space 43 between the folded-over mat surfaces so as to exit at one of the opposed lateral ends of the collector surface for connection with the recovery sprayer flow circuit described above.

In operation, one face surface of the folded-over mat 30 receives unobstructed spray streams from oppositely disposed recirculator sprayer assembly nozzles. The spray streams so collected travel down through the mat to the bottom wall of the tray where the ports 34 permit liquid to pass into the reservoir while limiting the admission of foreign particles thereinto. A corresponding lip surface 36, extending obliquely outwardly from the collector plane of the mat, serves to catch liquid drops falling from the mat. Due to the incline of the surfaces 36, the recovered drops drain back into the tray and are passed to the reservoir.

FIGS. 6 and 7 illustrate alternate embodiments of the lip concept, for example, wherein lip surfaces 36' may be formed on recovery reservoirs 44. In addition, the reservoirs 44 need not be cylindrically shaped but may be in the form of a rectangular box-like container provided with stop members 45 along interior sidewalls thereof to support mat trays 29' within upper end openings 46 of the reservoirs. As shown in FIG. 6, the box-like reservoir may be formed with sloped bottom wall portions 47 and 48 in the form of a trough or V such that the intake conduit 39 for the suction tube 38 extends along the deepest part of the trough for the recovery of liquid accumulating in the reservoir. As shown in FIG. 7, the box-like reservoir may be formed with a generally square-cut bottom wall surface 49.

FIG. 8 illustrates a still further collector section embodiment wherein a reservoir 52 is generally trough or V-shaped and formed with an upper slot opening 52 into which a fibrous mat collector surface 30 may be positioned in a folded-over condition. The flat upper wall 53 of the reservoir 51 in which the opening 52 is contained is formed with side surface openings 54 extending longitudinally with the slot 52 and between the slot and corresponding outer edges of the upper wall 53. These side openings 54 lie on a plane generally normal to the collector face surfaces formed by the mat 30. The openings 54 have screens 55 fitted thereacross to limit the admission of foreign particles into the reservoir and serve to catch drops falling from the collection surface of the mat. Liquid recovered through the side surface openings 54 flows downwardly in the reservoir for recovery along with liquid received from the collector mat 30 and recirculation back to the assembly supply tank.

Although various minor modifications may be suggested by those versed in the art, it should be understood that I wish to embody within the scope of the patent warranted hereon all such modifications as reasonably and properly come within the scope of my contribution to the art.

I claim as my invention:

1. In a recirculating spray assembly adapted for attachment to a vehicle for applying liquids to vegetation as the vehicle is driven over the vegetation and having support means, an upright collector mat mounted thereon, spray nozzles mounted on the support means directed toward the mat, an elongated open top reservoir mounted on the support means receiving the bottom end of the mat, a source of pressurized spray liquid carried by the vehicle connected to the nozzles, and means returning liquid from the reservoir to said source, the improvement comprising:

a screen device mounted in the open top of the reservoir between the mat and the interior of the reservoir effective to prevent entry of foreign particles into the reservoir and accommodating free hanging of the bottom end of the mat within the open top of the reservoir, said open top is of a width greater than said mat bottom end and said screen device loosely secures said mat bottom end in said open top, and said screen device is disposed between said mat and said spray nozzles, such that liquid drops falling from said mat may pass through said screen device into said reservoir.

2. The improvement of claim 1, wherein said screen device is a removable tray fitting in said reservoir open top having an open upper end for removably receiving the bottom end of said mat and a closed bottom wall having a plurality of screening perforations for passing liquid between said mat and said reservoir.

3. The improvement of claim 2, further comprising lip surface means extending toward the upper end of said tray for directing liquid drops falling from said mat into said tray.

4. The improvement of claim 3, wherein said lip surface means is formed on said tray and flare outward and upward from the upper end of said tray.

5. The improvement of claim 3, wherein said lip surface means is formed on said reservoir and flare obliquely upward from adjacent said reservoir open top.

6. The improvement of claim 2, wherein said mat is a folded-over fibrous surface, the free ends of which are supported in said tray.

7. The improvement of claim 6, wherein said tray bottom wall contains a circular opening and said means returning liquid includes a suction tube extending from inside said reservoir through said circular opening beneath said folded-over surface and exiting at one lateral end of said mat.

8. The improvement of claim 2, wherein said reservoir is generally trough-shaped and formed with lip surface means flared outward and upward from said open top.

9. The improvement of claim 1, wherein said screen device comprises at least one elongated screen mounted in an associated elongated opening formed in said reservoir between said mat and said spray nozzles and said mat bottom end is removably fitted in an elongated slot parallel and adjacent to said elongated opening and formed on said reservoir.

10. The improvement of claim 9, wherein there are two said elongated openings respectively containing screens formed on said reservoir on opposed sides of said mat.

11. The improvement of claim 1, wherein said screen device is a foraminous screen.

12. The improvement of claim 1, wherein said mat is a fibrous surface.

13. In a recirculating sprayer assembly for the application of herbicidal and other liquids to standing vegetation with recapture of liquid not contacting the vegetation, said assembly being carried on a vehicle and comprising a source of pressurized liquid carried on said vehicle, a plurality of spray nozzles communicating with said source and mounted on support means extending outward from said vehicle, at least one collector means mounted on said support means and having a collector surface substantially facing across from said spray nozzles to intercept spray streams issued from said spray nozzles, a reservoir means located below said collector means for collecting liquid flowing from said collector surface, and a recirculation flow means for returning liquid recovered in said reservoir means to said source, the improvement comprising:

a tray having an open upper end and a bottom wall formed with a plurality of screening holes for the passage of liquid therethrough, said tray upper end receiving a lower end of said collector surface, and said reservoir means having an upper end opening for receiving said tray in snug fashion within said reservoir means.

14. A sprayer assembly of claim 13, further comprising the improvement of lip surface means extending toward said tray for directing liquid drops falling from said collector surface into said tray.

15. In a recirculating sprayer assembly for the application of herbicidal and other liquids to standing vegetation with recapture of liquid not contacting the vegetation, said assembly being carried on a vehicle and comprising a source of pressurized liquid carried on said vehicle, a plurality of spray nozzles communicating with said source and mounted on support means extending outward from said vehicle, at least one collector means mounted on said support means and having a planar collector surface substantially facing across from said spray nozzles to intercept spray streams issued from said spray nozzles, a reservoir means located below said collector means for collecting liquid flowing from said collector surface, and a recirculation flow means for returning liquid recovered in said reservoir means to said source, the improvement comprising:

a longitudinal slot opening formed in an upper wall surface portion of said reservoir means for receiving the lower end of said collector surface, one longitudinal side opening formed in said upper wall surface portion of said reservoir means adjacent said slot opening for receiving drops of liquid falling from said collector surface and passing them into said reservoir, and screening means covering over said side opening to limit the admission of foreign particles into said reservoir means.

16. The improvement of claim 15, further comprising a second longitudinal side opening formed in said upper wall surface portion of said reservoir means adjacent said slot opening opposed from said one side opening for receiving drops of liquid falling from said collector surface and passing them into said reservoir when the collector surface side adjacent said second side opening faces the spray nozzles.

* * * * *